United States Patent [19]

Halberg

[11] Patent Number: 4,854,628
[45] Date of Patent: Aug. 8, 1989

[54] CARRYING RACK FOR A VEHICLE

[75] Inventor: Laurie L. Halberg, St. Cloud, Minn.

[73] Assignee: Custom Products of Litchfield, Inc., Litchfield, Minn.

[21] Appl. No.: 111,872

[22] Filed: Oct. 21, 1987

[51] Int. Cl.$^4$ ............................................. B60D 3/00
[52] U.S. Cl. .......................................... 296/3; 296/7; 280/756
[58] Field of Search ........................ 296/3, 102, 7, 8; 280/756; 211/195

[56] References Cited

U.S. PATENT DOCUMENTS 4,540,213  9/1985  Herlitz et al. ................... 211/195 X
4,659,131  4/1987  Flournoy ............................... 296/3

FOREIGN PATENT DOCUMENTS 237683  1/1960  Australia .............................. 211/195

Primary Examiner—Robert B. Reeves
Assistant Examiner—Brian Sells
Attorney, Agent, or Firm—Gregory P. Kaihoi

[57] ABSTRACT

A carrying rack mountable on a vehicle, such as a pickup, for carrying bulky and oversized objects. The rack is characterized by including a frame mountable to the bed of the vehicle and including a forward rack member. The frame also includes a pair of support members extending rearwardly of the front rack member, these support members including a pivotal connection carrying a rear rack section. The rear rack section is movable between a forward, folded position and a rearward, extended position for carrying large objects thereupon. The foldable nature of the rack permits easier access into the bed of the truck when the rack is not in use, while providing an aesthestically pleasing configuration, such as that of a roll bar. Optional winch means, lighting, and reflectors may also be incorporated in the unit.

9 Claims, 2 Drawing Sheets

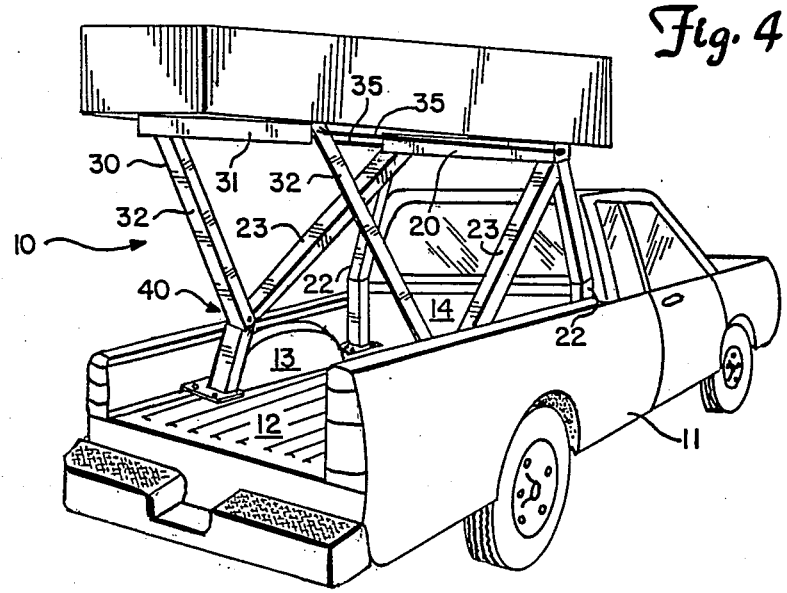
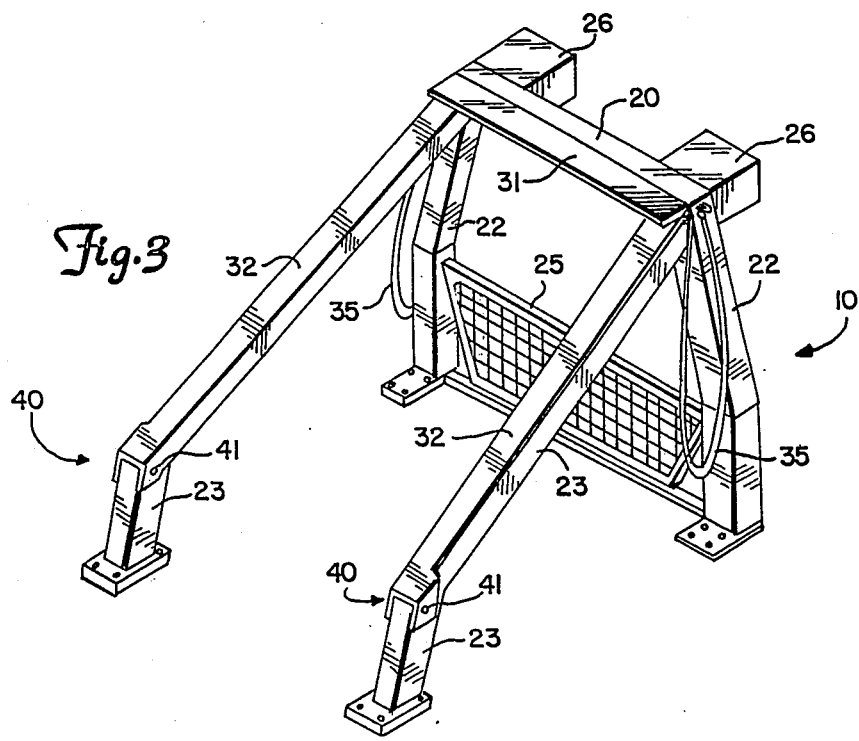

4,854,628

CARRYING RACK FOR A VEHICLE

TECHNICAL FIELD

The invention relates to racks for carrying loads on vehicles, and more specifically to a foldable rack for use on pickup trucks and the like.

BACKGROUND ART

Pickup trucks and similar vehicles frequently may be fitted with carrying racks of various types to facilitate carrying oversized objects that do not otherwise conveniently fit in or on the bed of the vehicle. For example, objects that are longer than a vehicle bed, such as pipes, tubing, or rolls of carpet, cannot be secured easily in the pickup bed without considerable difficulty in securely tying the object and/or damaging the vehicle, e.g., by placing heavy and/or abrasive objects on the roof of the cab. The above problems are particularly acute for mid-sized and compact size pickup trucks, many of which cannot even carry a four by eight sheet of plywood in the bed of the vehicle.

Prior art racks typically suited for such pickup trucks and similar vehicles generally have a rigid frame mounted to the vehicle, the frame typically extending upwardly from the four corners of the bed to a vertical height above the height of the cab. Such frames generally are not easily removed from the vehicle after installation, or, if they are removable, they may not be securely attached to the vehicle. Thus, such frames typically do not permit flexibility in utilization- while the rack permits some oversized loads to be carried by the vehicle, it inhibits some ordinary uses of the vehicle because the rack frame obstructs access to the interior of the bed. Furthermore, most such racks are aesthetically not very pleasing, and therefore are not suitable or desirable for use on sporty or stylish pickups.

DISCLOSURE OF INVENTION

The invention relates to a pickup rack which overcomes the aforementioned shortcomings of prior art devices. The rack includes frame means mounting a transverse forward rack member to the vehicle. A rear rack section, which preferably includes a pair of generally parallel support members carrying a generally transversely oriented rear rack member, is pivotally connected to the frame means so that the rear rack section is movable from a rearwardly extended position to a forward retracted position. In the rearward extended position, the rack is usable to carry bulky objects. In the forward, retracted position, the rack allows greatly enhanced access to the vehicle bed. In a preferred embodiment, when retracted the rear rack section nests against the forward rack member and frame. In this position the unit is aesthetically pleasing, somewhat approximating the looks (even if not the function) of a roll bar.

In another embodiment, the rear or front rack member may carry a winch, preferably mounted generally centrally on the rack member. The rear rack member may be stabilized in its extended position by a pair of cables attached at each end respectively of the forward rack member and the rear rack member, the cables thereby preventing the rear rack member from extending beyond a selected position.

BRIEF DESCRIPTION OF THE DRAWINGS

FIG. 3 is a perspective view of a rack of the invention in the closed or retracted position; and FIG. 4 is a perspective view of a pickup with a rack of the invention in the extended position and carrying a load thereon.

BEST MODE FOR CARRYING OUT THE INVENTION

Figure 1:
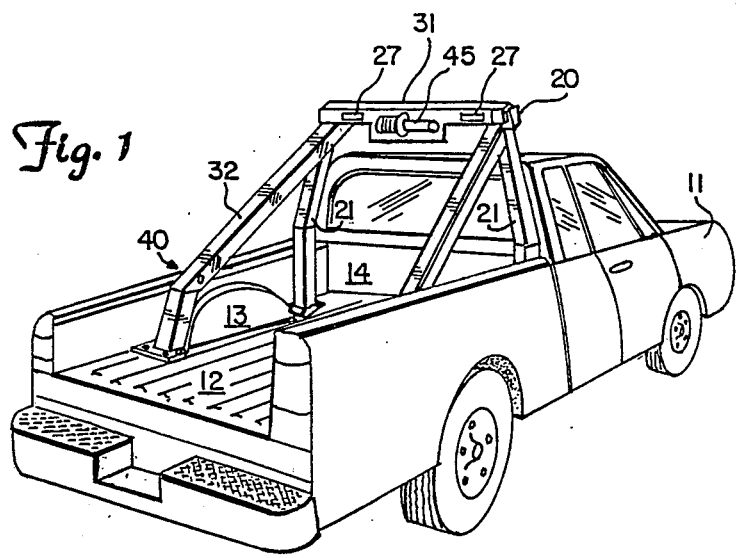
FIG. 1 is a perspective view of a pickup fitted with a carrying rack of the invention in the closed or retracted position.

FIG. 1 depicts the carrying rack (10) of the invention mounted in the bed (12) of a pickup truck (11). The invention is particularly suited for use in pickups, but is also useful and adaptable for use on other vehicles such as flatbed trucks and the like.

The rack (10) includes a front rack member (20) mounted to the truck (11) by frame means designated generally as (21). The frame means (21) may include a variety of structural members, but preferably includes a pair of generally vertical members (22) attached to the forward portion of the truck bed (12) and a pair of rearwardly and downwardly extending support members (23) which are attached preferably to the truck bed (12) rearward of the vertical support members (22). Desirably, the rearwardly extending support members (23) are attached to the truck bed (12) immediately behind the wheel wells (13). The support members (22 and 23) may be attached by any suitable means, including fastening them to the truck bed (12), the side walls of the truck (11), and/or, in the case of the rearwardly extending support members (23), to the wheel well (13). The support members (22 and 23) may be attached by bolts, welding or any other suitable means.

Figure 2:
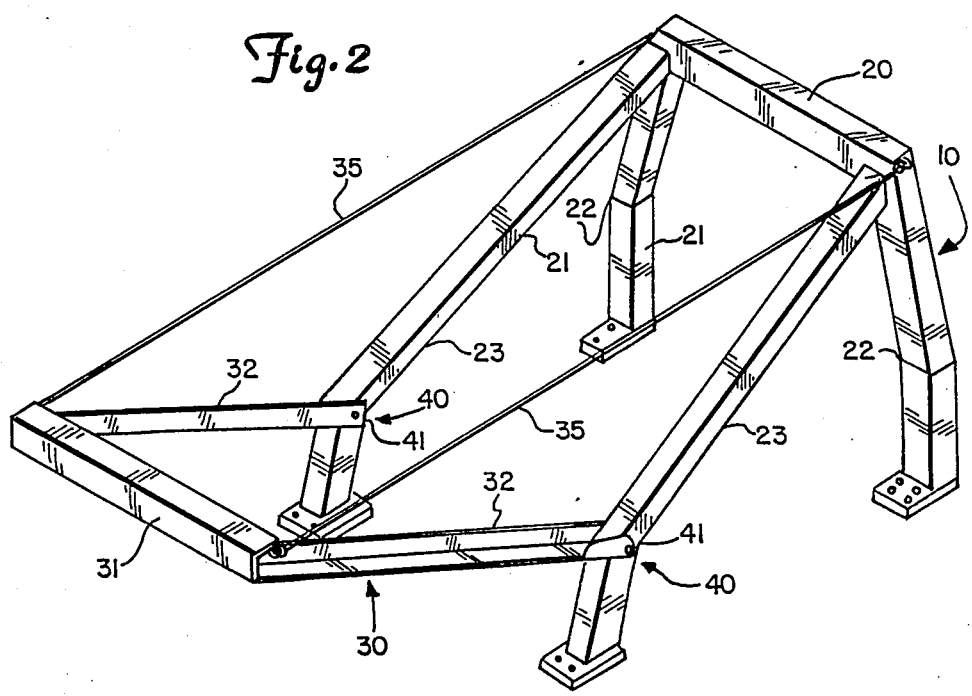
FIG. 2 is a perspective view of a rack of the invention in the extended or open position.

The rack (10) further includes a rear rack section (30) which includes a rear rack member (31), desirably extending generally transversely with respect to the vehicle, and a pair of rear rack support members (32) pivotally connected to the support members (23) of the frame (21). The rear rack section (30) is therefore movable between a forward, closed position as shown in FIG. 1 and a rearward, extended position as shown in FIGS. 2 and 4. Although the rear rack section (30) might be attached to the truck bed (12) independently of the front frame (21), such a configuration is less desired due to the extra labor involved in mounting the rack (10) to the vehicle (11).

The pivotal connection (40) between the rear rack section (30) and the front frame (21) may be accomplished by any suitable means, such as by pivot pins (41). Desirably the pivotal connection (40) is located approximately half way between the front rack member (20) and the rear rack member (31). The precise location of the pivotal connection means (40) will depend, however, upon the lengths of the respective support members (23 and 32).

The rear rack section (30) preferably is sized so as to nest closely against the front frame (21) and front rack member (20), thereby providing an aesthetically pleasing appearance. In a preferred embodiment this is accomplished by fabricating the front frame (20) from sections of appropriately welded square tubing, and the rear rack support members (32) and rear rack member (31) are fabricated from angle iron of dimensions compatible with the front frame (21). In the closed, forward position, the angle iron support members (32) therefore nest closely over the tubular support members (23). Similarly, the length of the rear rack support members (32) and location of the pivotal connection means (40) is so configured and oriented to allow the rear rack member (31) to rest immediately adjacent the front rack member (20). If desired, however, the rear support members (32) might be shortened or lengthened as desired.

Means is provided for selectively locating the extended, rearward position of the rear rack section (30) to provide structural integrity to the entire rack unit (10). In a preferred embodiment this is accomplished by providing a pair of cables (35) attached at the respective ends of the front and rear rack members (20 and 30), thereby preventing the rear rack section (30) from rotating more than a selected distance rearward. Although rigid mechanical links may be used in lieu of the cables, the cables (35) are particularly desirable because they automatically allow forward and rearward movement of the rear rack section (30) without manipulation of excess mechanical parts and without adding excessive weight or expense to the unit.

If desired, locking pins may be provided at or adjacent the pivotal connection means (40) for locking the rear rack section (30) in the forward or rearward position. Due to the mechanical forces likely to be borne by such a locking pin, particularly in the rearward position, it is desirable to utilize such pins only in connection with other means for securing the rear rack section (30) in the rearward position. Latch means may also be provided to lock and retain the rear rack section (30) in its forward, closed position to prevent it from bouncing, rattling, or accidentally opening when not in use.

An optional winch unit (45) may be attached to either the front rack member (20) or the rear rack member (31). In the drawings, the winch unit is shown as attached to the rear rack member (31). The winch unit is most useful for loading objects into the bed of the vehicle when the rear rack section (30) is in the forward position, but the winch may also be used when the rear rack section (30) is in the rearward, extended position, if desired.

An optional screen (25) or similar protective member may be included in the front rack frame (21) to protect the rear portion of the cab (14). The screen (25) may be hingedly connected at its top, bottom, or either side if desired, and further may be removable as desired. In a preferred embodiment such as is shown in FIG. 4, the screen is pivotable along a horizontal axis between first position as shown in the drawing and a second position where the screen protects the rear window of the pickup cab. Lighting units (26) and reflectors (27) also may be mounted at desirable locations on the rack (10).

While a preferred embodiment of the present invention has been described, it should be understood that various changes, adaptations and modifications may be made therein without departing from the spirit of the invention and the scope of the appended claims.

What is claimed is:

1. A rack mountable on a vehicle comprising:
a forward rack member;
frame means for mounting the forward rack member to the vehicle;
a rear rack section including a generally transverse rear rack member; and
connection means for pivotally connecting the rear rack section to the frame means and permitting movement of the rear rack section from a rearward, extend position to a forward position wherein the rear rack member lays generally adjacent to the forward rack member.

2. The rack of claim 1 wherein the frame means includes a pair of generally parallel support members attachable to the vehicle at a position rearward of the forward rack member.

3. The rack of claim 1 wherein the rear rack section includes a pair of generally parallel support members connecting the rear rack member to the pivotal connection means.

4. The rack of claim 1 further including restraining means for preventing the rear rack section from moving beyond the extended position.

5. The rack of claim 4 wherein the restraining means comprises one or more cables connecting the front rack member to the rear rack section.

6. The rack of claim 1 further comprising winch means carried by one of the rack members.

7. The rack of claim 6 wherein the winch means comprises a winch mounted generally centrally on the rack member.

8. A rack on a vehicle comprising:
a forward rack member;
frame means for mounting the forward rack member to the vehicle including a pair of generally parallel support members attachable to the vehicle at a position rearward of the forward rack member;
a rear rack section including a generally transverse rear rack member and support members therefor; and
connection means for pivotally connecting the rear rack support members to the frame means and permitting pivotal movement of the rear rack section from a rearward, extended position to a forward position, the support members being so configured and arranged as to permit them to lay generally adjacent to the frame support members when the rear rack section is in the forward position.

9. A rack mountable on a vehicle comprising:
a forward rack member;
frame means for mounting the forward rack member to the vehicle, the frame including a pair of generally parallel support members attachable to the vehicle at a position rearward of the forward rack member;
a rear rack section including a generally transverse rear rack member and a pair of generally parallel support members;
connection means for pivotally connecting the rear rack support members to the frame support members and permitting movement of the rear rack section from a rearward, extended position to a forward position wherein the rear rack member lays generally adjacent to the forward rack member; and
restraining means for preventing the rear rack section from moving beyond the extended position, the restraining means comprising one or more cables connecting the front rack member to the rear rack member.

* * * * *

UNITED STATES PATENT AND TRADEMARK OFFICE
CERTIFICATE OF CORRECTION

PATENT NO. : 4,854,628

DATED : August 8, 1989

INVENTOR(S) : Laurie L. Halberg

It is certified that error appears in the above-identified patent and that said Letters Patent is hereby corrected as shown below:

Column 4, line 6, replace "extend" with --extended--.

Column 4, line 28, after "rack", insert --mountable--.

Column 4, line 48, after "frame", insert --means--.

Signed and Sealed this

Nineteenth Day of November, 1991

Attest:

HARRY F. MANBECK, JR.

*Attesting Officer*      *Commissioner of Patents and Trademarks*